United States Patent Office 2,773,851
Patented Dec. 11, 1956

2,773,851
VINYL PLASTIC TILE AND METHOD OF MAKING THE SAME

Leo L. Tolman, Manor Township, Lancaster County, Pa., assignor to Armstrong Cork Company, Lancaster, Pa., a corporation of Pennsylvania No Drawing. Application December 22, 1952, Serial No. 327,417

4 Claims. (Cl. 260—30.6)

This invention relates to a vinyl plastic tile and a method of making the same. More particularly, the invention relates to a vinyl plastic floor tile composed of a filler and a plasticized binder including a vinyl resin having an intrinsic viscosity between 0.53 and 0.79, a coumarone resin having a ring and ball softening point in the range of about 95° C. to about 105° C., and a glycol phthalate resin. The method of my invention involves mixing, milling, calendering, and cutting the composition of my invention under carefully controlled conditions.

Tiles have been made from various vinyl resin compositions in accordance with procedures of the prior art. However, it has been exceedingly difficult to process such compositions because of the inability to obtain a workable mix without sacrificing the desirable properties imparted to the final product by the vinyl resin. In addition, certain vinyl resins, such as those containing vinylidene chloride, are of such a nature that elevated temperatures cannot be used to process the composition because of the danger of decomposition of the vinyl resin component. Therefore, with these prior art materials, in order to produce floor tiles possessed of grease resistance, alkali resistance, resistance to wear, and the like, it has been necessary to subject the material to severe working conditions, which requires special equipment and comparatively high expenditures for power.

I have found that outstanding floor tiles can be manufactured under controlled conditions which are readily obtained when particular vinyl resins are combined with particular coumarone resins and glycol phthalate resins in certain proportions to form a binder which may be compounded in certain proportions with filler material to produce a readily workable mass which can be processed to give outstanding floor tiles.

In accordance with my invention, the vinyl resins employed in producing the binder are vinyl chloride resins which have an intrinsic viscosity in cyclohexanone at 20° C. of between 0.53 and 0.79. Examples of such vinyl resins are copolymers of vinyl chloride and vinyl acetate containing 90% vinyl chloride and 10% vinyl acetate; copolymers of vinyl chloride and vinyl acetate containing 87% vinyl chloride and 13% vinyl acetate; copolymers of vinyl chloride and vinyl acetate containing about 87% vinyl chloride, about 12% vinyl acetate, and about 1% maleic anhydride as a modifying agent; and hydrolyzed copolymers of vinyl chloride and vinyl acetate. Of course, mixtures of such resins may be employed in the practice of my invention.

In order to impart the desired working characteristics to the composition of my invention, I include in the binder a coumarone resin which has a ring and ball softening point of about 95° C. to about 105° C. By the term "coumarone resin" I intend to include coumarone-indene resin. There may also be used hydrocarbon resins, such as polystyrene, polyindene, and the like. The term hydrocarbon resins is also intended to embrace resins obtained by subjecting coal tar fractions and petroleum fractions to polymerization conditions. Typical of the latter are polymers of unsaturated hydrocarbon, such as cracked petroleum oils and fractions thereof which are rich in styrene, methyl styrene, and the like. Typical coal tar fractions would include fractions which are rich in coumarone and indene.

In addition to the particular vinyl resins and coumarone resins, the binder contains resinous condensation products of dihydric alcohols and aromatic dicarboxylic acids. Among the dihydric alcohols which may be employed to form the condensation products are ethylene glycol, triethylene glycol, diethylene glycol, trimethylene glycol, tetraethylene glycol, and the like. Typical of the acids which can be used are phthalic acid, terephthalic acid, isophthalic acid, and the like. Of course, it is well known that anhydride of the acids may be used in the condensation reaction. These condensation resins, which may be identified as members of the class of glycol phthalate resins, are nonconvertible thermoplastic resins. They impart grease resistance to the finished product and also function as a processing aid in the method of my invention. Examples of glycol phthalate resins are diethylene glycol phthalate, ethylene glycol phthalate, triethylene glycol phthalate, and the like. Mixtures of these resins may be used, if desired.

The binder of the tile composition of my invention also includes a plasticizer for the vinyl resin. This may be any of the well-known plasticizers for vinyl resins, such as tricresyl phosphate, dibutyl phthalate, dioctyl phthalate, benzyl butyl phthalate, methyl pentachlorostearate, and the like. If desired, mixtures of plasticizers may be used.

The filler materials employed in the composition of my invention are advantageously a mixture of fine filler, such as ground limestone, serpentine, talc, and the like; and fibrous filler, such as asbestos, fibrous talc, and the like. Generally speaking, the composition of my invention comprises about 60% to about 80% filler and about 20% to about 40% binder. Pigments may be used in the tile to produce the desired color effect. Pigments such as titanium oxide, carbon black, iron oxide, ochre, or other suitable pigments can be used.

The filler component of my invention includes about 20% to about 60% by weight of fibrous filler, such as asbestos, and about 20% to about 60% by weight of fine filler, including pigments.

In order to obtain the desired properties in the tile, I find that the proportions of the various ingredients should be maintained within certain limits as follows:

Fine filler_____ about 20% to about 60%
Fibrous filler_____ about 20% to about 60%
Vinyl resin_____ about 10% to about 25%
Coumarone resin_____ about 1% to about 5%
Glycol phthalate resin_____ about 0.5% to about 5%
Plasticizer _____ about 5% to about 13%

In accordance with the process of my invention, all of the ingredients are charged to a mixer and mixed at temperatures up to about 325° F. While the time required to accomplish the desired mixing may vary, depending upon the temperature of operation of the mixer, the first-stage mixing normally requires about 21 to about 30 minutes when the steam pressure in the mixer jacket is about 125 to about 150 pounds per square inch. The mixed ingredients are then placed upon a mill to form what is known in the art as a blanket. The conditions of blanket formation are advantageously such that the cold roll is maintained at a temperature of about 190° F. to about 220° F. and the hot roll above about 275° F., advantageously about 275° F. to about 350° F. The stick temperature of the composition of my invention is in the range of about 190° F. to about 220° F. so the mass adheres to the cold roll in the blanket-forming operation. After the blanket is removed from the cold roll, it is passed through at least one calender to give the sheet the finished surface. In passing through the calender, the face roll is maintained at a temperature of about 110° F. to about 150° F. and the back roll at a temperature below about 110° F. Since the face roll is closer to the stick temperature, the material adheres to this roll but can be readily removed therefrom without marring the surface of the goods. Following passage through the calender, the material is cooled by means of water, air, or both, and is then cut into the tile shapes. Generally speaking, it is advantageous to bring the mass down to a temperature in the range of about 125° F. to about 150° F. before severing the sheet into tiles.

In a particularly advantageous embodiment of my invention, the blanket is passed through two calenders, the first calender operating with a top roll at a temperature of about 170° F. to about 220° F., advantageously about 190° F. to about 210° F., and the bottom roll operating at a temperature below about 90° F. Following passage through this calender, the finished calender is operated at a temperature on the face roll of about 110° F. to about 150° F., advantageously about 120° F. to about 130° F., and a temperature on the back roll of below about 110° F.

In order to more fully understand my invention, reference is made to the following specific examples:

Example I

| | Parts by weight |
|---|---|
| Asbestos fibers | 35 |
| Limestone | 35 |
| Vinyl chloride acetate copolymer containing 13% vinyl acetate and having an intrinsic viscosity of 0.53 | 17 |
| Coumarone-indene resin—ring and ball softening point 100° C. | 3 |
| Diethylene glycol phthalate | 2 |
| Tricresyl phosphate | 8.0 |

The ingredients were charged to a mixer and mixed for about 21 to 30 minutes. During the mixing cycle, the temperature attained was about 325° F. The resulting mix was then transferred to a mill and formed into a blanket. During milling, the temperature of the cold roll was maintained between 200° F. and 210° F. and the hot roll was maintained above about 275° F. The blanket was removed from the cold roll and passed through a calender, the face roll of which was maintained at a temperature in the range of 120° F. to 130° F. and the back roll of which was maintained below about 110° F. After calendering, the sheet was cooled and cut into tiles.

Example II

| | Parts by weight |
|---|---|
| Asbestos | 25 |
| Limestone | 50 |
| Vinyl resin of Example I | 14.2 |
| Coumarone resin of Example I | 3.5 |
| Diethylene glycol phthalate | 1.0 |
| Methyl pentachlorostearate | 3.0 |
| Benzyl butyl phthalate | 3.1 |
| Calcium stearate (stabilizer and lubricant) | 0.2 |

This composition was processed in accordance with the procedure of Example I and the resulting sheet cut into tiles.

Example III

| | Parts by weight |
|---|---|
| Asbestos | 37.0 |
| Ground limestone and pigments | 37.0 |
| Vinyl resin of Example I | 15.3 |
| Coumarone resin of Example I | 3.3 |
| Diethylene glycol phthalate | 1.0 |
| Methyl pentachlorostearate | 3.2 |
| Benzyl butyl phthalate | 3.2 |

Tiles were manufactured from this composition in accordance with the procedure of Example I.

Tiles produced in accordance with my invention are characterized by a smooth surface which has a comparatively high gloss and the materials are resistant to water, alkalies normally used in the home, and various greases normally used in the home. Because of the particular composition, the tiles may be formed by a process which does not require specialized equipment nor exceedingly high horsepower to accomplish working of the mass. The tiles are resistant to indentation and also are dimensionally stable. While my invention has been described with particular reference to a floor tile, the materials may also be used as a wall tile.

I claim:

1. A plastic tile composition comprising about 60% to about 80% filler and about 20% to about 40% by weight of a binder including a vinyl chloride resin having an intrinsic viscosity in cyclohexanone at 20° C. of between about 0.53 and about 0.79, a resin selected from the group consisting of coumarone resins and hydrocarbon resins, said resin having a ring and ball softening point between about 95° C. and about 105° C., a resinous dihydric alcohol-dicarboxylic acid condensation product, and a plasticizer.

2. A plastic tile composition comprising about 20% to about 60% fine filler, about 20% to about 60% fibrous filler, about 10% to about 25% vinyl chloride resin having an intrinsic viscosity in cyclohexanone at 20° C. of between about 0.53 and about 0.79, about 1% to about 5% resin selected from the group consisting of coumarone resins and hydrocarbon resins, said resin having a ring and ball softening point between about 95° C. and about 105° C., about 0.5% to about 5% glycol phthalate resin, and about 5% to about 13% by weight plasticizer.

3. A plastic tile composition comprising about 20% to about 60% fine filler, about 20% to about 60% fibrous filler, about 10% to about 25% vinyl chloride resin having an intrinsic viscosity in cyclohexanone at 20° C. of between about 0.53 and about 0.79, about 1% to about 5% coumarone-indene resin having a ring and ball softening point between about 95° C. and about 105° C., about 0.5% to about 5% glycol phthalate resin, and about 5% to about 13% plasticizer.

4. A plastic tile composition comprising the following ingredients in substantially the following percentages by weight:

| | Percent |
|---|---|
| Limestone | 35 |
| Asbestos fibers | 35 |
| Vinyl chloride acetate copolymer containing 13% vinyl acetate and having an intrinsic viscosity in cyclohexanone at 20° C. of 0.53 | 17 |
| Coumarone-indene resin having a ring and ball softening point of 100° C. | 3 |
| Diethylene glycol phthalate | 2 |
| Tricresyl phosphate | 8 |

References Cited in the file of this patent

UNITED STATES PATENTS

| | | |
|---|---|---|
| 2,309,571 | Bruce et al. | Jan. 26, 1943 |
| 2,508,414 | Meyer | May 23, 1950 |
| 2,529,260 | Powers | Nov. 7, 1950 |
| 2,542,179 | Buchanan | Feb. 20, 1951 |
| 2,557,091 | Gamrath et al. | June 19, 1951 |